April 2, 1963   A. W. HOLSTEIN ET AL   3,084,047
VENDING MACHINE
Filed July 29, 1959
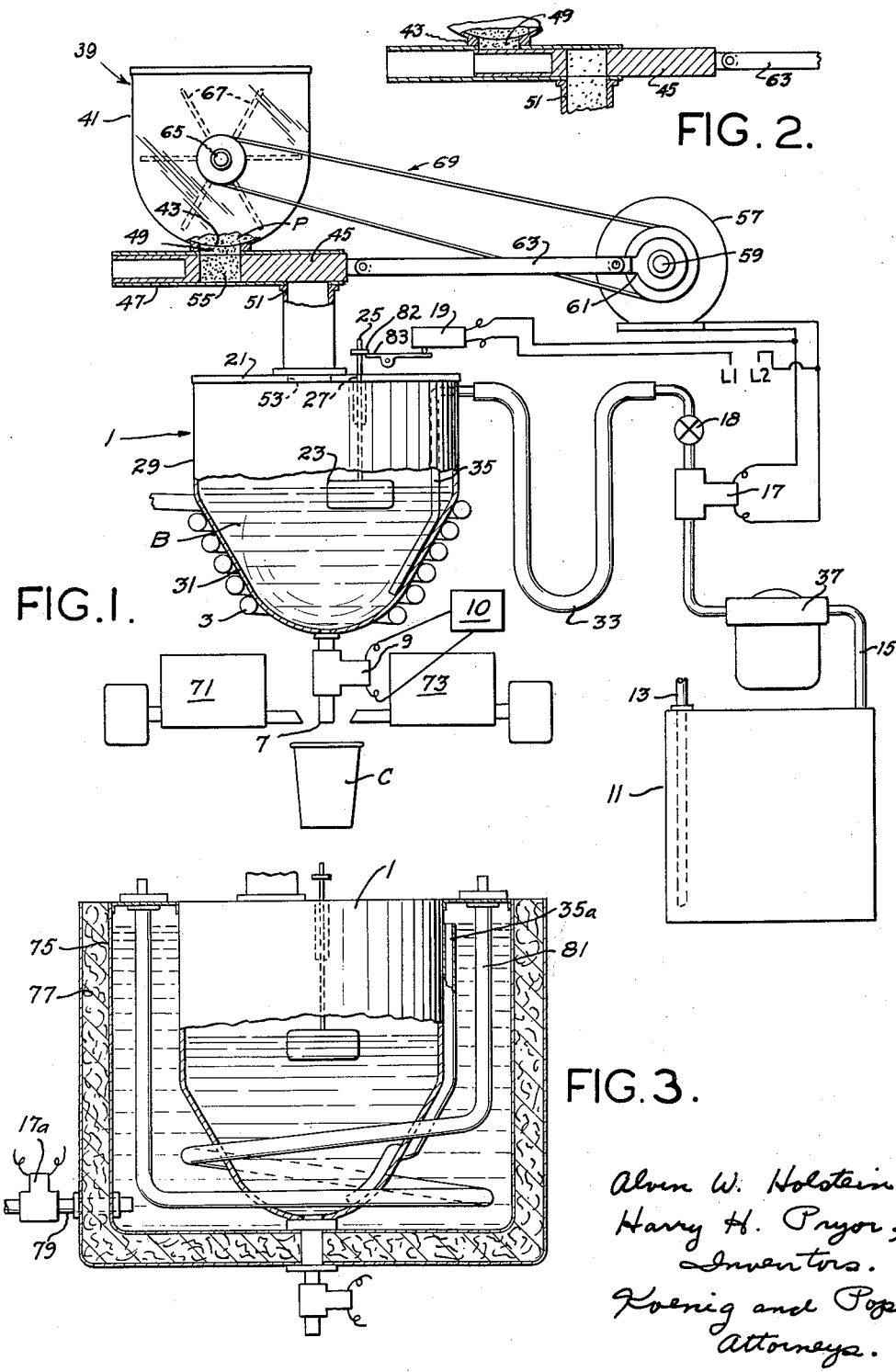

3,084,047
VENDING MACHINE
Alvin W. Holstein, Lemay, and Harry H. Pryor, St. Louis, Mo., assignors to National Vendors, Inc., St. Louis, Mo., a corporation of Missouri
Filed July 29, 1959, Ser. No. 830,235
5 Claims. (Cl. 99—65)

This invention relates to vending machines, and more particularly to a machine and method for vending coffee brewed by mixing hot water and instant coffee powder.

It has been found that in brewing coffee by mixing hot water and instant coffee powder, the flavor of the coffee is best if the coffee is allowed to brew for about four or five minutes or more. It has also been found that, in general, coffee brewed by mixing hot water and instant coffee powder may be kept for a substantial length of time without adverse effect on its flavor.

Accordingly, among the several objects of this invention may be noted the provision of an apparatus and method for brewing coffee by mixing hot water and instant coffee powder, particularly for use in a vending machine, in which brewed coffee is maintained hot in an urn for sufficient time to bring out the maximum flavor prior to being dispensed to a customer; the provision of an apparatus and method such as described in which, when a certain amount (such as one cup) of coffee has been drawn off from the urn, hot water is fed into the urn to make up for the amount delivered, and an amount of instant coffee powder (for example, a teaspoon of the powder) proportional to the amount of hot water is also fed into the urn and mixed with the brew therein; the provision of apparatus of the class described in which the mixing in the urn is accomplished in such a way as to avoid entraining air in the coffee (which would adversely affect the flavor of the coffee); and the provision of apparatus such as described in which the hot water to be fed into the urn is utilized to maintain the brewed coffee in the urn hot. Other objects and features will be in part apparent and in part pointed out hereinafter.

The invention accordingly comprises the constructions and methods hereinafter described, the scope of the invention being indicated in the following claims.

In the accompanying drawings, in which several of various possible embodiments of the invention are illustrated, FIG. 1 is a view in elevation, with parts broken away and shown in section, of an apparatus of this invention;

FIG. 2 is a fragment of FIG. 1 showing a moved position of parts; and,

FIG. 3 is a vertical section showing a modification.

Corresponding reference characters indicate corresponding parts throughout the several views of the drawings.

Referring to FIG. 1 of the drawings, a brewing and dispensing apparatus of this invention is shown to comprise a container or urn 1 of sufficient capacity to hold a plurality of cups of brewed coffee. The urn may have a twenty-cup capacity, for example. A heater for maintaining brewed coffee in the urn hot (at about 180° F., for example) is indicated at 3. This may be an electrical resistance heater, for example. Insulation (not shown) may be provided around the urn. The urn has a bottom spigot 7 including a solenoid valve 9. When valve 9 is energized and opened, brewed coffee flows from the turn into a cup C dispensed into position beneath the spigot by a conventional cup dispenser (not shown) such as ordinarily used in beverage dispensing machines. Valve 9, as will be readily understood, is under control of a coin-controlled means such as indicated at 10, which may be of any suitable well-known type such as ordinarily used in beverage dispensing machines, operable upon insertion of the proper amount in coin to maintain the valve 9 energized and hence open for the time required to deliver a serving of one cup of coffee, and then to deenergize and close the the valve to cut off the flow.

Means is provided for maintaining a predetermined liquid level in the urn 1 thereby to maintain a substantially constant plural-cup quantity (twenty cups, for example) of brewed coffee B in the urn. As shown in FIG. 1, this means includes a conventional hot water tank 11 having its inlet 13 connected to the usual water supply. Extending from the outlet of the tank to the urn is a hot water delivery line 15 in which is provided a solenoid valve 17. Line 15 may include a regulating valve 18 for regulating the rate of flow through line 15. Valve 17 is under control of a float-operated switch 19 which may be mounted on the cover 21 of the urn. A float 23 in the urn has a switch-actuating rod 25 extending upward through a hole 27 in the cover, the arrangement being such that with a predetermined level of liquid in the urn, rod 25 is raised by the float and switch 19 is open. A collar 82 is positioned on the upper end of rod 25 to contact switch lever 83. The time at which the switch will close is dependent upon the distance of the collar 82 from the float 23. As coffee is drawn off from the urn and the float descends, rod 25 descends and the switch closes. Solenoid valve 17 is thereupon energized and opens. Hot water then flows from the tank 11 to the urn until the liquid level in the urn is brought back up to the twenty-cup level, at which point switch 19 reopens, with the result that valve 17 closes to cut off further flow of hot water to the urn. Thus, an amount of hot water is fed into the urn corresponding to the amount of coffee withdrawn from the urn. The construction may be such that switch 19 closes each time one cup of coffee is withdrawn from the urn, or it may be such that the switch does not close until more than one cup, but less than the plural-cup quantity in the urn, is withdrawn from the urn.

The urn 1, as shown in FIG. 1, has a cylindrical upper wall 29 and a generally conical bottom 31. Spigot 7 extends down from the center of the bottom. The hot water supply line is connected by means of a flexible tube 33 to a delivery pipe 35 which extends down into the urn from the top thereof along the wall 29 and part way along the bottom 31. This pipe 35 terminates somewhat short of the center of the bottom. Supply line 15 may include a filter or purifier 37 for hot water flowing from tank 11 through valve 17 to the urn. Water pressure is maintained from the water supply so that water in inlet 13, tank 11 and line 15 is always under pressure.

Above the urn 1 is a dispenser 39 for instant coffee powder adapted upon each actuation thereof to deliver a measured amount of powder into the urn. Dispenser 39 comprises a hopper 41 for containing a supply of instant coffee powder P. The hopper has a bottom outlet 43 for gravity feed of the powder into a measuring and delivery unit comprising a slide 45 guided for reciprocation in a housing 47. Housing 47 has a top inlet 49 in register with hopper outlet 43 and a bottom outlet 51 spaced longitudinally from inlet 49. As shown, outlet 51 is in the form of a flanged fitting and has its lower end mounted on the urn cover 21 in register with a powder inlet 53 in the urn cover. Slide 45 has a vertical hole 55 therethrough which constitutes a powder measuring chamber, and is adapted for reciprocation between the loading position in which it appears in FIG. 1 wherein hole 55 registers with powder inlet 49 and the discharge position of FIG. 2 wherein hole 55 registers with powder outlet 51.

At 57 is indicated an electric motor-speed reducer unit having an output shaft 59. The motor may be of a well known type having a suitable braking mechanism so that the motor will stop abruptly upon deenergization thereof. A crank 61 is secured on this shaft and connected to slide 45 by a link 63. The arrangement is such that upon each revolution of shaft 59, slide 45 is moved from its loading position to its discharge position and then back to its loading position. A shaft 65 extends across the hopper and has agitator vanes 67 thereon in the hopper for agitating the powder P to keep it from caking and to insure free flow thereof into hole 55 in slide 45. Shaft 65 is adapted to be driven as by means of a belt and pulley drive 69 from shaft 59.

Sugar and cream units, such as are conventional and well known in coffee vending machines, may be provided as indicated at 71 and 73.

The solenoid valve 17 and the electric motor of unit 57 are connected in parallel with switch 19 in a suitable powder supply circuit, the arrangement being such that whenever switch 19 is closed, both the solenoid valve 17 and the motor are energized. The circuit for such an arrangement is shown in FIG. 1 with L1 and L2 designating the power lines.

Operation is as follows:

The urn 1 will normally contain a predetermined plural-cup quantity, for example, twenty cups, of brewed coffee B. The coffee is maintained hot in the urn by the urn heater 3. When solenoid valve 9 is energized upon insertion of the proper amount in coin in the machine, a cup of coffee is delivered through the spigot 7 into the cup C. When this cup of coffee is withdrawn from the urn, the float 23 drops and switch 19 is thereupon closed with the result that solenoid valve 17 and the motor of unit 57 are both energized. Hot water is thereupon delivered through line 15 (valve 17 being open) into the urn, entering the urn through delivery pipe 35. Valve 17 remains open until the level of brew in the urn has risen back up to the twenty-cup level. Thus, one cup of hot water is delivered to the urn to replace the cup of brewed coffee that was withdrawn. In the time that it takes the one cup of hot water to be delivered to the urn, the motor of unit 57 (being energized on closure of switch 19) operates to cause a single stroke of slide 45, during which the slide 45 moves from its loading position of FIG. 1 to its discharge position of FIG. 2 and then back to its loading position of FIG. 1. This results in the dispensing of a measured amount of powder into the urn, the amount being sufficient (one teaspoon, for example) for mixing with the one cup of hot water fed into the urn. During the operation of motor of unit 57, the shaft 65 is rotated so that vanes 67 agitate the coffee in the hopper 41 to insure loading of the slide 45 when it returns to its loading position.

Due to the inclination of the lower end of the delivery pipe 35 and the shape of the bottom portion 31 of the urn, there occurs a vertical swirling of the brew in the urn. This provides for mixing of the powder fed into the urn with the brew in the urn (including the cup of hot water fed into the urn) without any substantial entrainment of air with the brew.

Thus, immediately upon the dispensing of a cup of coffee from the urn, the supply of brewed coffee in the urn is replenished to the original predetermined quantity (for example, the twenty-cup quantity). Accordingly, successive customers are assured of obtaining coffee at least a major portion of which has brewed long enough to reach the peak of flavor, even though successive customers obtain coffee in relatively rapid succession. For locations where relatively rapid successive withdrawals are anticipated, an urn of large capacity (for example, a fifty-cup capacity) may be used. Even though relative long intervals may elapse between successive withdrawals of cups of coffee, the flavor of the coffee is not adversely affected, since, as previously pointed out, coffee brewed by mixing hot water and instant coffee powder may be kept a considerable length of time without adverse effect on its flavor.

FIG. 3 illustrates a modification in which the hot water that is to be fed into the urn is utilized to maintain the brewed coffee in the urn hot. As shown in this modification, the urn 1 is provided with a water jacket 75. Insulation may be provided around this jacket as indicated at 77. Water is fed into this jacket through a line 79 connected to the usual water supply, line 79 including a solenoid valve 17a corresponding to the valve 17 of FIG. 1. The urn 1 contains the same float 23 and the same float-controlled switch 19 is provided as in FIG. 1. An immersion heater 81, which may be an electric resistance heater, is provided for heating the water in the jacket 75. With this arrangement, the hot water in the jacket maintains the coffee in the urn hot. When valve 17a is energized and opened in response to closure of switch 19, the level of water in the jacket rises, and the water overflows into pipe 35a corresponding to pipe 35 of FIG. 1 for delivery into the urn. This brings the level of brew in the urn back up to the predetermined level (for example, the stated twenty-cup level) and as soon as this occurs, the switch 19 is opened with resultant deenergization of valve 17a (in the same manner as the deenergization of valve 17 when switch 19 is opened in the embodiment shown in FIG. 1) to cut off the supply of water to the jacket.

It will be understood that in referring to instant coffee powder as the solute to be dissolved in the hot water, it is intended to cover not only the pulverized type of instant coffee, but also instant coffee which may be in granular as distinguished from pulverized form. In general, the principles of the invention would be applicable to the brewing of coffee using any coffee solute or even other beverages by mixing water or other liquid and a solute.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

We claim:

1. Apparatus for brewing and dispensing coffee comprising an urn in which coffee is adapted to be brewed and maintained hot for serving and from which brewed coffee may be withdrawn a cup at a time, and means for maintaining a substantially constant plural-cup quantity of brewed coffee in the urn comprising means for feeding hot water into the urn including a valve, means for holding a supply of instant coffee powder, means for dispensing powder from said supply into the urn, and means responsive to withdrawal from the urn of a predetermined amount of brewed coffee less than said plural-cup quantity for opening said valve and operating said dispensing means until an amount of hot water corresponding to the amount of brewed coffee withdrawn from the urn is delivered to the urn and an amount of powder proportional to the amount of hot water is dispensed into the urn, said means for feeding hot water into the urn further including means for introducing the hot water into the urn at such point and in such direction as to cause a vertical swirling of the coffee in the urn, the powder being introduced at the top of the urn.

2. Apparatus as set forth in claim 1 wherein the urn has a conical bottom portion and the means for introducing the hot water into the urn comprises a pipe extending downward along said conical bottom portion.

3. Apparatus for brewing and dispensing coffee comprising an urn in which coffee is adapted to be brewed and maintained hot for serving and from which brewed coffee may be withdrawn a cup at a time, and means for maintaining a substantially constant plural-cup quantity of brewed coffee in the urn comprising means for feeding hot water into the urn including a valve, means for holding a supply of instant coffee powder, means for dispensing powder from said supply into the urn, and means responsive to withdrawal from the urn of a predetermined amount of brewed coffee less than said plural-cup quantity for opening said valve and operating said dispensing means until an amount of hot water corresponding to the amount of brewed coffee withdrawn from the urn is delivered to the urn and an amount of powder proportional to the amount of hot water is dispensed into the urn, said means for feeding hot water into the urn comprising a jacket around the urn for containing water, water in the jacket being adapted to overflow into the urn, a line for feeding water into the jacket from a supply under pressure, said valve being in said line, and means for heating the water in said jacket, the hot water in the jacket acting to maintain the coffee in the urn hot.

4. A machine for vending brewed coffee comprising an urn in which coffee is adapted to be brewed and maintained hot for serving, means for heating the urn, said urn having an outlet for delivery of brewed coffee therefrom, a valve for controlling delivery of brewed coffee from the urn through said outlet, coin-controlled means operable upon insertion of coin in the machine to hold the valve open to dispense a single cup of coffee from the urn, a hopper for holding a supply of instant coffee powder, and means for maintaining a substantially constant plural-cup quantity of brewed coffee in the urn comprising means operable in response to withdrawal from the urn of a predetermined amount of brewed coffee less than said plural-cup quantity for feeding a corresponding amount of hot water directly into the urn and for dispensing powder from the hopper directly into the urn in measured amount proportional to the amount of hot water fed into the urn, whereby the coffee resulting from dissolving of the powder in the hot water is brewed for a sufficient length of time to bring out its full flavor before being dispensed.

5. The method of vending coffee with the coffee being made by dissolving instant coffee powder in hot water comprising providing a predetermined plural-cup quantity of coffee brewed from instant coffee powder and hot water in an urn, maintaining the brewed coffee in said urn heated, dispensing a single cup of brewed coffee from the urn in response to deposit of coin and resulting operation of the machine by a purchaser, feeding hot water into the urn in response to withdrawal from the urn of a predetermined amount of the brewed coffee less than said plural-cup quantity with the amount of water so fed into the urn corresponding to the amount of brewed coffee so withdrawn, and simultaneously dispensing instant coffee powder from a supply thereof into said urn with the amount of powder so dispensed proportional to the amount of hot water so fed into the urn, whereby coffee resulting from dissolving of the powder in the hot water is brewed in the urn for a sufficient length of time to bring out its full flavor before being dispensed.

References Cited in the file of this patent

UNITED STATES PATENTS

| | | |
|---|---|---|
| 1,506,712 | McAllen | Aug. 26, 1924 |
| 1,508,809 | White | Sept. 16, 1924 |
| 1,668,540 | McAllen | May 1, 1928 |
| 1,869,720 | Strand | Aug. 2, 1932 |
| 2,314,421 | Peterson | Mar. 23, 1943 |